No. 832,741. PATENTED OCT. 9, 1906.
M. MILCH.
REPULSION MOTOR CONTROL.
APPLICATION FILED APR. 30, 1904. RENEWED FEB. 9, 1906.

2 SHEETS—SHEET 1.

Witnesses.
Harry H. Tilden
Helen Oxford

Inventor.
Maurice Milch.
by Albert H. Davis
Att'y.

No. 832,741. PATENTED OCT. 9, 1906.
M. MILCH.
REPULSION MOTOR CONTROL.
APPLICATION FILED APR. 30, 1904. RENEWED FEB. 9, 1906.

2 SHEETS—SHEET 2.

Witnesses.
Harry H. Tilden
Helen Orford

Inventor.
Maurice Milch.
by Albert H. Davis
Att'y.

UNITED STATES PATENT OFFICE.

MAURICE MILCH, OF SCHENECTADY, NEW YORK, ASSIGNOR TO GENERAL ELECTRIC COMPANY, A CORPORATION OF NEW YORK.

REPULSION-MOTOR CONTROL.

No. 832,741.  Specification of Letters Patent.  Patented Oct. 9, 1906.

Application filed April 30, 1904. Renewed February 9, 1906. Serial No. 300,321.

*To all whom it may concern:*

Be it known that I, MAURICE MILCH, a subject of the King of Austria-Hungary, residing at Schenectady, county of Schenectady, State of New York, have invented certain new and useful Improvements in Repulsion-Motor Control, of which the following is a specification.

My invention relates to alternating-current motors of the type known as "repulsion," in which single-phase current is supplied to the primary member, while the secondary member is short-circuited by means of a commutator and brushes, the motor being arranged and connected to induce a current in the short circuit and to produce a magnetization at an angle to said short circuit.

The object of my invention is to enable such motors to be operated without sparking at the commutator over much wider ranges of speed than has been possible heretofore. It has been found in practice that while repulsion-motors show practically no sparking at speeds near synchronism very violent sparking results if the motor speed is carried a certain amount above synchronism.

By my invention I render it possible to operate repulsion-motors at all speeds, both above and below synchronism, without injurious sparking at the commutator.

My invention will best be understood by reference to the accompanying drawings, in which—

Figure 1:
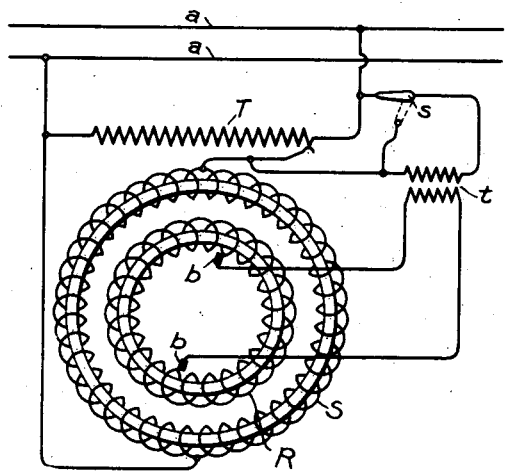
Figure 2:
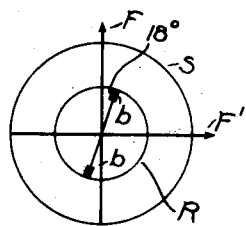
Figure 3:
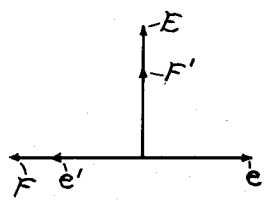
Figure 4:
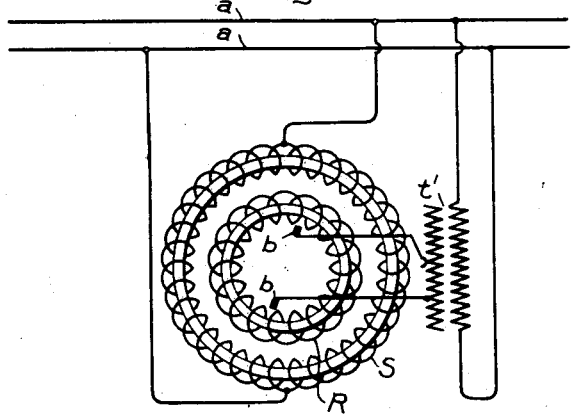
Figure 5:
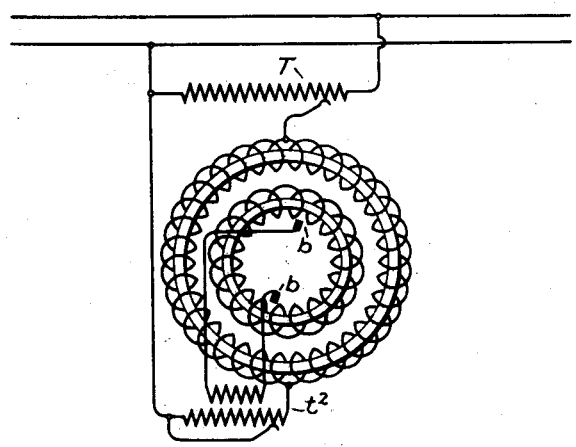
Figure 6:
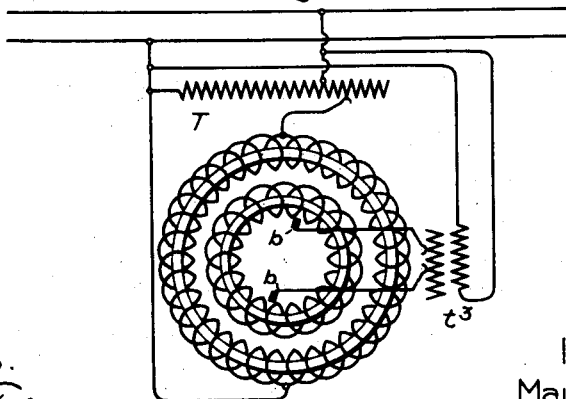

Figure 1 shows diagrammatically an arrangement embodying my invention. Figs. 2 and 3 are explanatory diagrams, and Figs. 4, 5, and 6 show modifications of the arrangement of Fig. 1.

Referring first to Fig. 2, S represents diagrammatically the stator or primary member of an alternating-current motor supplied with single-phase current so as to produce a magnetization indicated by the arrow F. R represents the rotor, short-circuited by means of the commutator-brushes $b\,b$ on a line at an angle to the line of the primary field F. The current in rotor R produces a cross-field F′ in phase with the rotor-currents. It is this field which produces the motor torque. If the rotor-coils short-circuited by the brushes $b\,b$ are considered, it will be seen that they are subject to two sources of electromotive force. In the first place, an electromotive force will be induced in these coils, due to cutting the primary field F. In the second place, an electromotive force will be induced in these coils by transformer action by the field F′. The phase relations of these electromotive forces are shown in Fig. 3. Thus if E represents the primary impressed electromotive force, F represents the primary magnetization ninety degrees out of phase with the impressed electromotive force E. F′ represents the cross-field, due to the rotor-currents. Near synchronism the rotor-currents are nearly in phase with or in opposition to the primary impressed electromotive force, and consequently the field F′, which is in phase with the rotor-currents, may be represented as practically in phase with the primary electromotive force E. It has been said that the short-circuited coils are subject to two electromotive forces induced by cutting the field F and by transformer action from the field F′. Thus the electromotive force due to cutting the field F is represented by a line $e$ in opposition to field F. The electromotive force induced by transformer action by field F′ is represented by a line $e'$ ninety degrees out of phase with the field F′.

From the foregoing it will be seen that the electromotive forces $e$ and $e'$ are nearly in opposition and nearly equal at synchronism. Consequently the resultant electromotive force in the rotor-coils short-circuited by the brushes is very small at synchronism, which is the reason why practically sparkless operation is obtained at nearly synchronous speeds. As the speed of the motor increases above synchronism, however, the electromotive force $e$, due to cutting the field F, will increase, owing to the greater speed of rotation, while, on the other hand, the electromotive force $e'$, induced by transformer action by field F′, will grow smaller, since the rotor-currents decrease in strength. The electromotive force $e$ will consequently overpower the electromotive force $e'$, heavy currents will flow in the rotor-coils short-circuited by the brushes, and violent sparking will result. Now if it were possible to reduce the value of the electromotive force $e$ or to increase the electromotive force $e'$ it is evident that the sparking would be reduced. The electromotive force $e$ can be reduced by reducing the field F or, in other words, by reducing the impressed electromotive force to which the field F is due; but simply reducing the impressed electromotive force would decrease the output of the motor, and, furthermore, the rotor-currents, and consequently field F' and electromotive force $e'$, would also be reduced, so that the gain would be small.

My invention consists in compensating for the reduced primary impressed electromotive force by impressing upon the rotor-brushes an electromotive force of the proper amount to compensate for the reduced primary input, and thereby to maintain the output of the motor at its normal value. By this means the electromotive force $e$ may be reduced at speeds above synchronism without reducing the rotor-currents and the electromotive force $e'$ and sparkless operation of the motor obtained without impairing the output of the motor.

Referring now to Fig. 1, S represents diagrammatically the stator of a replusion-motor connected to the line-wires $a$ $a$ through the autotransformer or other voltage-regulator T. R represents the rotor supplied with the commutator-brushes $b$ $b$, which, instead of being short-circuited in the usual manner, are connected to the secondary of a transformer $t$. $s$ is a switch in the circuit of the primary of transformer $t$, adapted to short-circuit the primary or to connect one terminal to a terminal of the autotransformer T. The other terminal of transformer $t$ is connected to the movable contact of the autotransformer T. The operation is then as follows: The movable contact of transformer T is placed so as to impress upon the stator-winding S a voltage suitable for starting, while switch $s$ is moved to the position shown in dotted lines. Transformer $t$ is thereby short-circuited, and the rotor-brushes are consequently short-circuited. The motor therefore starts as an ordinary repulsion-motor and may be brought up to speed by shifting the movable contact of autotransformer T. As synchronous speed is reached the movable contact may be placed so as to impress the full-line voltage upon the stator-winding and switch $s$ may be moved to the position shown in full lines. In this position of switch $s$ transformer $t$ and consequently brushes $b$ $b$ are still short-circuited. Now if it is desired to operate the motor above synchronism the movable contact of transformer T may be moved to reduce the electromotive force impressed upon the stator-winding S. This movement of the movable contact will at the same time introduce an impressed electromotive force upon the primary of transformer $t$, which if transformer $t$ is properly proportioned will impress upon the rotor-brushes $b$ $b$ an electromotive force of the proper amount to compensate for the reduced amount of energy supplied to the stator-winding, thereby maintaining the output of the motor at its normal value.

Fig. 4 shows an arrangement in which the entire control is obtained by manipulating the rotor-circuit, the stator-winding S being left permanently connected to the mains $a$ $a$. The rotor-brushes $b$ $b$ are connected to the secondary of a shunt-transformer $t'$ through movable contacts, so arranged that not only may the impressed electromotive force on the brushes be varied, but also the direction of electromotive force be reversed. This arrangement is particularly well adapted for operation below synchronism as well as above. At starting, an electromotive force may be impressed upon the rotor-brushes opposing the electromotive force induced in the winding by the starting-field. The amount of starting-current is in this manner limited to its proper value. As the motor speeds up this counter electromotive force is reduced until at or near synchronous speed the rotor-brushes are short-circuited. For speeds above synchronism an electromotive force is again impressed upon the rotor-brushes $b$ $b$, but opposite in direction to that impressed at starting. This electromotive force supplies to the rotor an electromotive force of the proper phase and amount to prevent sparking both above and below synchronism; but with this arrangement of constant impressed voltage on the primary the motor output is greater above synchronism than it would be if the primary impressed voltage were reduced.

Fig. 5 shows another arrangement in which the rotor-brushes $b$ $b$ are connected to the secondary of a series transformer $t^2$, which is provided with a movable contact, so that more or less of the primary may be short-circuited. At starting, the entire primary of transformer $t^2$ may be short-circuited, thereby short-circuiting the rotor-brushes $b$ $b$, and the starting-current of the motor may be regulated by the autotransformer T. For speeds above synchronism the proper electromotive force of the rotor may be obtained by removing the short circuit from variable operations of the primary of series transformer $t^2$. In the same way a shunt-transformer $t^3$ may be employed, as shown in Fig. 6. In this arrangement I have shown the connections between the commutator-brushes and the secondary of transformer $t^3$ arranged to permit of reversal as well as variation of the electromotive force impressed upon the rotor-brushes. Control by the manipulation of the rotor-circuit may thus be obtained, as shown in Fig. 4, and I have also shown in this arrangement the autotransformer T controlling the primary circuit, and thereby permitting the motor to give approximately the same output above synchronism as if the motor were operated in the usual way with constant primary voltage and short-circuited secondary.

Many other arrangements of the transformers or voltage-regulators may be employed in carrying out my invention with either manual or automatic control. Accordingly I do not desire to limit myself to the particular construction and arrangement of parts here shown, since changes which do not depart from the spirit of my invention will be obvious to those skilled in the art.

I have defined a repulsion-motor above as an alternating-current motor of the type in which single-phase current is supplied to the primary member, while the secondary member is short-circuited by means of commutator and brushes, the motor being arranged and connected to induce current in the short circuit and to produce a magnetization at an angle to the short circuit. It is with this meaning that I employ the term "repulsion-motor" in the appended claims, and I desire it to be understood that this term embraces both arrangements in which the field which induces current in the short circuit and the field at an angle thereto are produced by the same set of connections or coils and motors in which these two fields are produced by different sets of connections or by different windings.

What I claim as new, and desire to secure by Letters Patent of the United States, is—

1. The method of improving commutation of a repulsion-motor at speeds above synchronism, which consists in reducing the electromotive force impressed on the primary member, and impressing a compensating electromotive force on the secondary member.

2. The method of improving commutation of a repulsion-motor for varying speeds, which consists in impressing on the secondary member an electromotive force variable in magnitude and in direction.

3. The method of improving commutation of a repulsion-motor for varying speeds, which consists in impressing an electromotive force on the secondary member at starting, reducing said electromotive force as the motor speeds up, then reversing the electromotive force when the motor passes synchronous speed, and then increasing the electromotive force as the motor speed further increases.

4. The method of improving commutation of a repulsion-motor for operation above synchronism, which consists in impressing on the secondary member when the motor passes above synchronous speed an electromotive force opposing the electromotive force induced in the secondary coils by cutting the primary coil.

5. The method of improving the commutation of a repulsion-motor for operation above synchronism, which consists in impressing on the secondary member when the motor passes above synchronous speed an electromotive force opposing the electromotive force induced in the secondary coils by cutting the primary field and increasing said impressed electromotive force as the motor speed further increases.

6. The method of improving the commutation of a repulsion-motor for operation above synchronism which consists in impressing upon the secondary member an electromotive force assisting the electromotive force induced in the secondary coils by transformer action by the primary field.

7. The method of improving commutation of a repulsion-motor at speeds above synchronism, which consists in impressing an electromotive force on the secondary member and varying the electromotive forces impressed on the primary and secondary members as the motor speed varies.

8. The method of improving commutation of a repulsion-motor at speeds above synchronism, which consists in reducing the primary impressed electromotive force, and impressing on the secondary member an electromotive force adapted to compensate for the reduced input to the primary.

9. The method of improving commutation of a repulsion-motor for varying speeds, which consists in maintaining an approximate balance of the electromotive forces in the rotor-coils short-circuited by the brushes induced by cutting the primary field and by transformer action of the cross-field respectively.

10. The method of improving commutation of a repulsion-motor for varying speeds, which consists in varying the relative strengths of the primary field and of the cross-field so as to maintain an approximate balance of the electromotive forces induced by said fields in the rotor-coils short-circuited by the brushes.

11. In combination with a repulsion-motor, means for impressing on the secondary member of said motor an electromotive force variable in magnitude and in direction.

12. In combination with a repulsion-motor, means for impressing a variable electromotive force on the secondary member of said motor, and means for varying the primary impressed electromotive force.

13. In combination with a repulsion-motor, means for impressing an electromotive force on the secondary member of said motor, and means for simultaneously varying the primary and secondary impressed electromotive forces.

14. In combination with a repulsion-motor, regulating-transformers connected respectively to the primary and secondary members of said motor.

15. In combination with a repulsion-motor, means for varying the relative strengths of the primary field and of the cross-field, with varying speeds of the motor to maintain an approximate balance of the electromotive forces induced by said fields in the rotor-coils short-circuited by the brushes.

In witness whereof I have hereunto set my hand this 29th day of April, 1904.

MAURICE MILCH.

Witnesses:
BENJAMIN B. HULL,
HELEN ORFORD.